United States Patent [19]
DeHaitre

[11] Patent Number: 5,516,248
[45] Date of Patent: May 14, 1996

[54] LOW TORQUE WOOD SCREW

[75] Inventor: Lon DeHaitre, Arlington Heights, Ill.

[73] Assignee: Abbott-Interfast Corporation, Wheeling, Ill.

[21] Appl. No.: 302,130

[22] Filed: Sep. 7, 1994

[51] Int. Cl.$^6$ .............................. F16B 25/00; F16B 23/00
[52] U.S. Cl. .......................................... 411/387; 411/399
[58] Field of Search ..................................... 411/386, 387, 411/399, 411, 424

[56] References Cited

U.S. PATENT DOCUMENTS

| | | | |
|---|---|---|---|
| 430,236 | 6/1890 | Rogers | 411/424 |
| 1,966,835 | 7/1934 | Stites | 411/424 |
| 2,895,368 | 7/1959 | Place | 411/399 |
| 4,439,077 | 3/1984 | Godsted | 411/411 |

FOREIGN PATENT DOCUMENTS

| | | | |
|---|---|---|---|
| 3448 | of 1892 | United Kingdom | 411/386 |
| 15102 | 10/1902 | United Kingdom | 411/399 |

*Primary Examiner*—Steven N. Meyers
*Assistant Examiner*—Tuyet-Phuong Pham
*Attorney, Agent, or Firm*—Welsh & Katz, Ltd.

[57] ABSTRACT

A low torque fastener screw for securing a wooden workpiece to a substrate includes an elongated body defining a longitudinal axis and having an enlarged head formed on one end, an external pointed thread formed on an opposite end, an elongated unthreaded shank between the enlarged head and the threaded end, and a reamer formed at the juncture of the shank and thread. The reamer has a plurality of longitudinal cutting edges formed about its periphery which ream out the hole formed by the threaded end to a diameter larger than the shank, thereby reducing frictional resistance to rotation of the screw and optimizing the torque applied by the driving tool.

13 Claims, 1 Drawing Sheet

5,516,248

LOW TORQUE WOOD SCREW

BACKGROUND OF THE INVENTION

The present invention relates generally to fastener screws, and more particularly to a novel fastener screw having improved installation characteristics which result in optimizing torque applied to the screw when securing a workpiece, such as a wooden plank, wood composite, or plastic, to a substrate, such as an underlying structural member, into which the screw is driven.

In many applications where fastener screws are employed to secure work pieces together, such as two or more pieces of wood or the like, it is desired that the screw be driven into the work pieces sufficiently so that the top of the screw head is flush with or recessed below the outer surface of the outermost workpiece. For example, in assembling wooden decks, it is a common practice to secure the deck planking to support joists or the like with flathead deck screws so that no part of the screw head protrudes above the upper deck surface.

In securing a workpiece, such as a deck plank, to a substrate, such as a joist, by deck screws as disclosed in U.S. Pat. No. 5,199,839, a threaded lead end of the screw is driven through the plank into the joist by applying rotational torque to the screw head. In deck screws of this type, an unthreaded shank or wire joins the screw head to the threaded lead end and normally extends at least partially through the plank when the threaded lead end is driven into the substrate or joist. In order to withstand the torque necessary to drive the threaded end through the plank into the substrate, the unthreaded screw shank or wire typically may have a diameter substantially equal to or greater than the major diameter of the screw thread. While sometimes necessary to provide sufficient strength, provision of a relatively large diameter shank appreciably increases the torque necessary to drive the screw through a workpiece and into the substrate because the periphery of the hole formed by the thread frictionally engages the shank and increases the resistance to rotation for a given size deck screw.

While not specifically drawn to deck screws, U.S. Pat. Nos. 471,179 and 470,804 to Jones disclose wood screws wherein a knurled surface is formed between the screw thread and a shank so that the knurled surface tends to enlarge the hole created by the screw thread as the screw is driven into a workpiece. The knurled surfaces on the screws are provided merely as an aid to thread rolling and are the same size as the shank. Thus, while the knurled surfaces slightly enlarge the holes created by the threaded ends of the screws, each shank continues to frictionally engage the perimeter of the hole created by the thread resulting in frictional drag between workpiece and shank.

U.S. Pat. No. 5,295,774 to Roberts discloses a screw which on first blush appears similar to the present invention. However, the Roberts screw is concerned with an entirely different problem than the present invention, namely, the protection of a screw shank coating in a corrosive environment in applications where a metal cladding must be secured to roof or wall structures. The Robert's screw protects the shank by reaming a hole in the metal cladding that may also be of the same diameter as the shank. If the Robert's screw were driven into a wooden workpiece, the hole created by the threaded end of the screw would not be enlarged by the knurled surface sufficiently to appreciably reduce the frictional drag between shank and workpiece.

Where the workpiece (i.e., deck planking) is relatively thick and has been treated or impregnated with a weather resistant material, the wood is generally tougher and more resistant to insertion of fastener screws. A fastener screw of the deck screw type which facilitates securing of wood members, such as deck planks, to wooden structural supports, and which is capable of reducing the frictional relation between the screw shank and deck plank would greatly reduce the torque necessary to overcome frictional resistance and significantly optimize the torque applied to drive the screw into the wooden support and countersink the screw head, thereby providing a substantial advance over prior deck screws.

SUMMARY OF THE INVENTION

The solution to the problem of optimizing the torque applied to a wood screw of the type having a generally cylindrical elongated shank between a head end and an opposite pointed threaded end when the screw is driven through a first workpiece, such as a wooden plank, to secure the workpiece to a wooden substrate lies, conceptually, in reducing the friction between the screw shank and the workpiece as the screw is driven into the supporting wooden substrate. Friction is reduced in accordance with the present invention by establishing a discrete region of the screw body at the juncture of the thread end and shank portion which acts as a reamer to create a small clearance between the shank and the first workpiece. It has been determined that the increased torque required by the reamer in slightly enlarging the hole formed by the thread passing through the workpiece is more than offset by the reduction in torque resulting from reduced frictional interference between the screw shank and workpiece.

In carrying out the present invention, a fastener screw is provided which finds particular application in securing wooden deck planking to a wood substrate such as a joist. The fastener screw includes an elongated body defining a longitudinal axis and having an enlarged bugle-shaped head formed on one end, an external pointed helical thread formed on an opposite end, and a generally cylindrical elongated shank formed between the head and threaded end so that when the screw is driven through a wooden plank into a joist, the shank extends at least partially, and preferably completely, through the hole formed in the plank by the threaded end of the screw. An enlarged upset is formed integral with the screw body at the juncture of the shank and lead end thread and has a plurality of longitudinal serrations or cutting edges about its periphery coaxial with the longitudinal axis of the screw. An outer cylindrical envelope generally tangent to the serrations has a diameter larger than the diameter of the shank but less than the major diameter of the threaded end. The serrations serve to ream a clearance hole through the plank for receiving the shank as the threaded end enters the substrate joist. In this manner the shank undergoes substantially reduced frictional resistance to passage through the plank so as to reduce the torque required by the screw to drive it into the substrate member.

Accordingly, one of the primary objects of the present invention is to provide a novel wood screw which finds particular application as a deck screw and which is configured to optimize the torque applied to the screw in driving it through a wooden plank or the like and into a supporting substrate such as a wooden joist.

A more particular object of the present invention is to provide a novel wood screw having a bugle-shaped head on one end with serrations on its underside to assist in countersinking the head, an external pointed helical thread on an opposite end, an elongated shank between the head and proximal end of the thread, and an enlarged upset at the juncture of the shank and proximal end of the thread, the enlarged upset defining external longitudinal serrations or cutting edges which ream out the hole formed in the plank as the threaded end of the screw is driven through the plank into the substrate, thereby minimizing friction between shank and plank and optimizing the applied torque to drive the screw into the substrate.

A further object is to provide a novel wood screw that increases drive tool life and reduces screw installation time, firstly by forming a clip relief slot at the threaded entry end of the screw, and secondly by reaming a clearance hole for non-interfering low-friction entry of a shank of the screw into the workpiece.

Further objects, features and advantages of the present invention will become apparent from the following detailed description taken in conjunction with the accompanying drawing wherein like reference numeral represent like elements throughout the several views.

DETAILED DESCRIPTION

Figure 1:
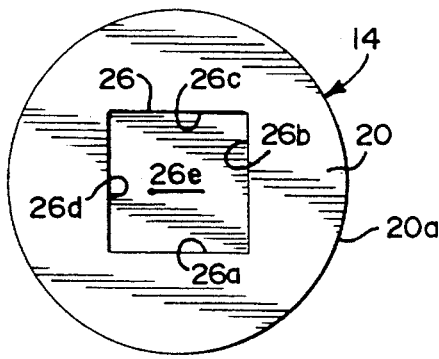
FIG. 1 is a perspective view of a fastener screw constructed in accordance with the present invention.
Figure 2:
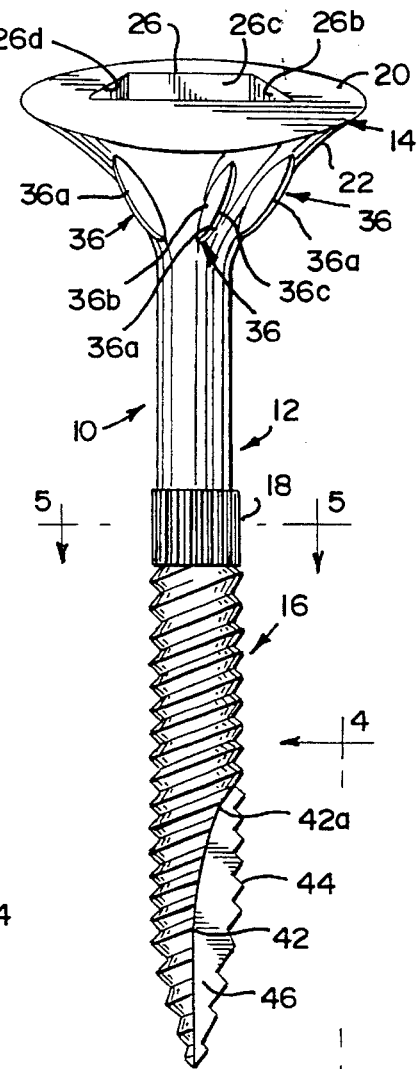
FIG. 2 is a plan view of the fastener screw of FIG. 1.

Referring now to the drawing, a fastener screw constructed in accordance with the present invention is indicated generally at 10 in FIG. 1. The fastener screw 10, which may alternatively be termed a deck screw, is made of a suitable metallic material, preferably a non-corrosive steel such as non-magnetic 300 series stainless steel. Alternatively, the fastener screw may be made of a suitable cold rolled steel. The screw 10 is similar to the screw disclosed in U.S. Pat. No. 5,199,839 which is assigned to the assignee of the present invention and is incorporated herein by reference.

The fastener screw 10 includes a unitary metallic body having a generally cylindrical shank or wire 12, a head 14 formed at one end of the shank 12, and a thread 16 formed on an opposing end of the unitary metallic body. An enlarged upset 18 is formed at the juncture of the proximal end of the thread 16 and shank 12 and defines a reamer which separates the threaded portion 16 from the shank 12 and head 14 portions of the unitary body.

The fastener screw 10 finds particular application in fastening two or more work pieces made of wood, plastic, or wood composites (the latter being compositions of wood fibers intermixed with a suitable binder, such as a polymer) to form a composite workpiece. When employed to fasten two or more such work pieces together, the fastener screw 10 provides improved installation and holding characteristics by facilitating rapid installation with a power drive device such as an electric or pneumatically driven rotary drive tool.

The fastener screw 10 may be of any desired length. A nominal length of approximately 2½ inches has been found particularly useful when fastening work pieces of approximately 1½ in thickness, generally termed a 2 inch nominal thickness.

Figure 3:
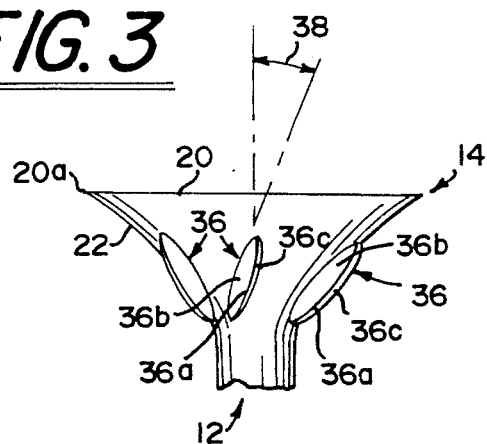
FIG. 3 is a fragmentary elevational view illustrating the angular relationship of serrations formed on the underside of the screw head.

In a preferred embodiment, the shank 16 occupies approximately one-half of the total length of the screw 10. The reamer 18, shank 12 and screw head 14 occupy the remaining length. The shank 12 is generally cylindrical wire gage and has a diameter generally equal to the pitch diameter of the single-lead threaded end 16 which may vary depending upon the length and intended use of the fastener screw. The screw head 14 is formed integral and coaxial with the shank 12 and has an upper flat or planar surface 20 having a circular periphery 20a and lying in a plane substantially transverse to the longitudinal axis of the shank 12. The underside of the head 14 is defined by an annular concave surface 22 intermediate the outer periphery 20a of the flat head surface 20 and a center portion of the shank 12. The profile of the concave surface 22, as considered in the plane of FIG. 3, may have a generally uniform radius. If desired, the profile of the concave surface 22 may be formed to what is generally termed a bugle shaped head, that is, a profile wherein the radius of curvature increases progressively from the periphery 20a of the upper surface 20 to the shank 12.

The planar end surface 20 on the screw head 14 has a polygonal shaped drive recess 26 formed therein to facilitate receipt of a correspondingly shaped tool for rotational driving of the screw 10. In the illustrated embodiment, the polygonal shaped drive recess 26 takes the form of a rectangular or square recess having four mutually perpendicular equal area sidewalls 26 a–d which intersect the top surface 20 in normal relation thereto and intersect a recessed planar bottom surface 26e which lies parallel to the top surface of the screw head. In this manner, the screw 10 may be used with a power drive tool to effect threaded engagement with one or more work pieces, with the polygonal drive recess eliminating cam-out or inadvertent release of the drive tool.

The right handed thread 16 may have multiple threads such as a double or triple lead coarse thread similar to a type A sheet metal thread, but preferably is of a single thread design. Thus for each revolution of the fastener screw, the screw will move longitudinally a distance equal to the pitch of the thread. Stated alternatively, each revolution of the fastener screw 10 will cause the screw to move longitudinally into the workpiece one-half as fast as a double lead thread or one-third as fast as a triple lead thread.

Figure 5:
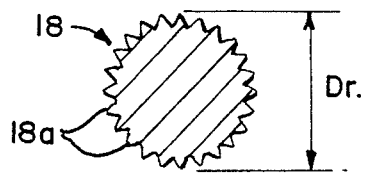
FIG. 5 is a transverse sectional view, on an enlarged scale, taken substantially along line 5—5 of FIG. 1.

The reamer 18 is shown in greater detail in FIG. 5. The reamer 18 has a generally circular transverse cross-section and defines a plurality of longitudinal serrations or cutting edges 18a which are equidistantly spaced around the periphery of the reamer. The longitudinal cutting edges 18a are parallel with the longitudinal axis of the screw 10. The major diameter $D_r$ of the reamer 18 is chosen to be slightly larger (i.e., 1–2 mils) than the diameter of the shank 12 but less than the major diameter of the external thread 16. The axial length of the reamer 18 is chosen to have a value comparable to the diameter of the shank 12 or comparable to a diameter of the threaded portion of the fastener screw 10.

The use of a single thread facilitates thread cutting action by advancing the cutting edge 44 at a successfully effective rate. The relatively slow advance rate allows the cutting edge to engage and cut surrounding wood fibers before advancing into new wood. The slower longitudinal advance rate provides more effective cutting performance. The shorter axial length of the reamer, in turn, reduces the torque requirements of installing.

A plurality of self-locking serrations or ridges are formed on the underside of the screw head 14 so as to project outwardly from the concave surface 22. In the embodiment illustrated in FIG. 3, the serrations or ridges are defined by a plurality of equidistantly circumferentially spaced projections or ridges 36 which are formed integral with the screw head and have outwardly projecting convex cutting edges 36a formed by the intersection of two corresponding converging side walls 36b and 36c. In the illustrated embodiment, approximately four to six serrations 36 are formed about the concave surface 22, although fewer or more serrations may be employed as desired. Each of the serrations or ridges 36 extends from slightly below the peripheral edge 20a of the screw head 14 downwardly to a position slightly above the cylindrical surface of the shank 12. Each serration 36 is preferably angled or inclined relative to the longitudinal axis of the fastener screw at an angle in the range of approximately 5–25 degrees, considered as the included angle 38 between the longitudinal axis of the fastener screw and a plane containing the corresponding cutting edge 36a and normal to the plane of FIG. 3. Alternatively, the serrations or ridges 36 and associated cutting edges 36a may extend to the peripheral edge 20a of the screw head and lie parallel to the longitudinal axis of the screw, that is, with the cutting edges 36a lying in planes containing the longitudinal axis of the screw. The serrations 36 and corresponding cutting edges 36a may also have generally S-shaped curvatures or a scalloped configuration, as considered in FIG. 3, such that the lower head portion of the cutting edges 36a are inclined in the direction of rotation of the screw when threaded into a workpiece. When the screw 10 is threaded into a workpiece, the serrations or cutting ridges 36 bore out or displace the adjacent material, and/or bend and compress the wood fibers or wood fibers interspersed with a polymer in a wood/plastic composite material in a burring action. This enables the screw head to be readily drawn into the workpiece such that the top surface 20 of the screw is flush with or recessed below the surface of the workpiece. The serrations or ridges 36 also effect a locking action with the workpiece wherein they substantially inhibit loosing the screw.

Figure 4:
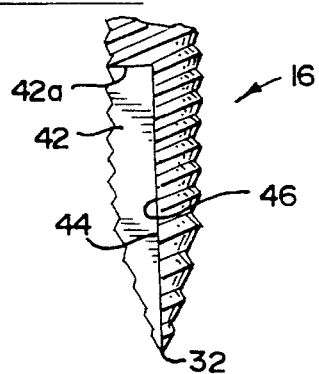
FIG. 4 is a fragmentary elevational view taken substantially along line 4—4 of FIG. 1.

A chip relief slot or flute 42 is formed in the single-lead thread 16 so as to extend from the middle point 32 longitudinally along the thread to somewhat beyond the first full diameter thread such as indicated at 42a. As illustrated in FIGS. 1 and 4, the chip relief slot or flute 42 may be formed as a milled or ground slot which generally removes a quadrant of the screw thread 16 leaving a longitudinally thread profile cutting edge 44 formed at the intersection of a radial boundary wall 46 with the outer profile of the adjacent thread 16. The cutting edge 44 provides a cutting action as the single-lead thread 16 enters the workpiece which facilitates easier movement of the screw into the workpiece. The fibers or other material removed by the cutting edge 44 are compacted into the chip relief slot to further facilitate rapid entry of the fastener screw into the workpiece.

Having thus described a preferred embodiment of the fastener screw 10 in accordance with the present invention, it will be appreciated that the fastener screw 10 provides an easy starting, quick driving, self drilling, and low insertion torque screw which facilitates use with a power driver. The square shaped drive recess 26 prevents cam-out of the drive tool as is frequently encountered with Phillips head style screws or the like. Further, the square drive recess enables more precise operator control and provides longer tool life. As the screw is threaded into one or more work pieces, such as wood, plastic or composite wood/plastic material, the reamer 18 cuts away fibers which would otherwise engage the screw shank and thereby reduces frictional resistance with resulting optimization of driver torque in driving the screw into the workpieces and seating the head beneath the work surface. A significant benefit is a reduction in installation time and increased drive tool life.

Additionally, the bugle-shaped head and corresponding serrations or ridges 36 assist in pulling the screw head into the workpiece to a desired flush or recessed position. The serrations 36 bore out the adjacent surface of the workpiece, thereby easing entry of the screw while effecting a self-locking action to inhibit loosening of the screw after installation. During threading into a workpiece, the longitudinal thread profile cutting edge 44 and associated chip relief slot 42 provide a cutting action on the workpiece and enable the end fibers and the like to be compacted into the chip relief slot, thereby further facilitating rapid installation of the screw into a workpiece eliminating the need for pre-drilling with redundant reduction of installation time and cost.

While a preferred embodiment of the present invention has been illustrated and described, it will be understood that changes and modifications may be made therein without departing from the invention and its broader aspects. Various features of the invention are defined in the following claims.

What is claimed is:

1. A low torque fastener screw for securing a wooden workpiece to a substrate, the fastener screw comprising: an elongated body defining a longitudinal axis; an enlarged head portion disposed on an end of the elongated body, the head portion having a generally planar end surface disposed substantially transverse to the longitudinal axis and having a drive recess therein; an external thread disposed on an opposite end of the elongated body and terminating in a point to facilitate entry of the screw into the wooden workpiece and substrate; an elongated generally cylindrical shank coaxial with the longitudinal axis and disposed between the enlarged head and the thread; and a generally annular reamer surface coaxial with the longitudinal axis and disposed between the external thread and elongated shank, the reamer surface having an outer diameter larger than the shank but less than a major diameter of the external thread so as to ream a clearance hole for substantially non-interfering entry of the elongated shank into the wooden workpiece as the fastener screw is driven through.

2. The fastener screw as in claim 1 wherein the enlarged head portion further comprises an underside defined by a generally concave annular surface interposed between the end surface and the shank.

3. The fastener screw as in claim 2 wherein the enlarged head portion further comprises a plurality of outwardly projecting serrations formed about a periphery of the concave surface, each of the serrations extending substantially from the end surface to the shank and being inclined relative to the longitudinal axis of the screw in a direction of a thread lead angle of the external thread so that the serrations burr into a fibrous surface of the wooden workpiece bending a portion of the fibrous surface surrounding the enlarged head portion in a direction of drive to reduce torque to ease countersinking of the enlarged head portion and effect a self-locking action with the fibrous surface as the screw is threaded into the fibrous surface.

4. The fastener screw as in claim 1 wherein the external thread further comprises a single lead thread.

5. The fastener screw as in claim 1 wherein the external thread further comprises a generally longitudinal chip relief slot formed therein adjacent the pointed end.

6. The fastener screw as in claim 1 wherein the reamer further comprises a plurality of axially extending serrations surrounding the elongated body.

7. The fastener screw as in claim 6 wherein the axially extending serrations further comprise an axial length substantially equal to a diameter of the external thread of the fastener screw.

8. The fastener screw as in claim 1 wherein the fastener screw further comprises a deck screw.

9. A low torque screw for securing a wooden workpiece to a substrate, such screw comprising:

an elongated unitary body divided into a first end and a second end along a longitudinal axis by a circumferential series of axially extending serrations of a generally larger overall diameter than a center portion of the first end; an enlarged head portion disposed on a distal end of the unitary body at the first end, the head portion having a generally planar end surface disposed substantially transverse to the longitudinal axis of the center portion of the first end and having a drive recess therein, the head portion having an underside defined by a generally concave annular surface interposed between the end surface and the center portion of the first end; an external thread disposed on the second end of the unitary body terminating in a point at a distal portion of the second end, the external thread having a generally longitudinal cutting edge and chip relief slot formed therein adjacent the pointed end.

10. The low torque screw as in claim 9 wherein the axially extending serrations are of an axial length substantially equal to a diameter of the external thread.

11. The fastener screw as in claim 9 wherein the external thread further comprises a single lead thread.

12. The fastener screw as in claim 9 wherein the fastener screw further comprises a deck screw.

13. A low torque screw fastener system for securing a wooden workpiece to a substrate comprising:

a wooden workpiece;

a substrate;

a fastener screw comprising:

an elongated body defining a longitudinal axis;

an enlarged head portion disposed on an end of the elongated body, the head portion having a generally planar end surface disposed substantially transverse to the longitudinal axis and having a drive recess therein;

an external thread disposed on an opposite end of the elongated body and terminating in a point to facilitate entry of the screw into the wooden workpiece and substrate;

an elongated generally cylindrical shank coaxial with the longitudinal axis and disposed between the enlarged head and the thread; and a generally annular reamer surface coaxial with the longitudinal axis and disposed between the external thread and elongated shank, the reamer surface having an outer diameter larger than the shank but less than an outer diameter of the external thread so as to ream a clearance hole for substantially non-interfering entry of the elongated shank into the wooden workpiece as the fastener screw is driven through.

* * * * *

UNITED STATES PATENT AND TRADEMARK OFFICE
CERTIFICATE OF CORRECTION

PATENT NO. : 5,516,248
DATED      : May 14, 1996
INVENTOR(S) : DeHaitre

It is certified that error appears in the above-indentified patent and that said Letters Patent is hereby corrected as shown below:

Title page, item [56],
Add the following references under "U.S. PATENT DOCUMENTS":

```
--   470,804    3/1892     Jones
     471,179    3/1892     Jones
   3,358,548   12/1967     Dyslin
   3,699,841   10/1972     Lanius, Jr.
   3,739,682    6/1973     Siebol et al.
   4,621,963   11/1986     Reinwall
   5,199,839    4/1993     DeHaitre
   5,295,774    3/1994     Roberts--
   3,869,219    3/1975     Wilson et. al.
```

Signed and Sealed this

Twenty-sixth Day of August, 1997

Attest:

BRUCE LEHMAN

*Attesting Officer*    Commissioner of Patents and Trademarks